No. 733,805. PATENTED JULY 14, 1903.
C. E. BLUE.
MACHINE FOR THE MANUFACTURE OF GLASSWARE.
APPLICATION FILED NOV. 16, 1896.
NO MODEL. 2 SHEETS—SHEET 1.
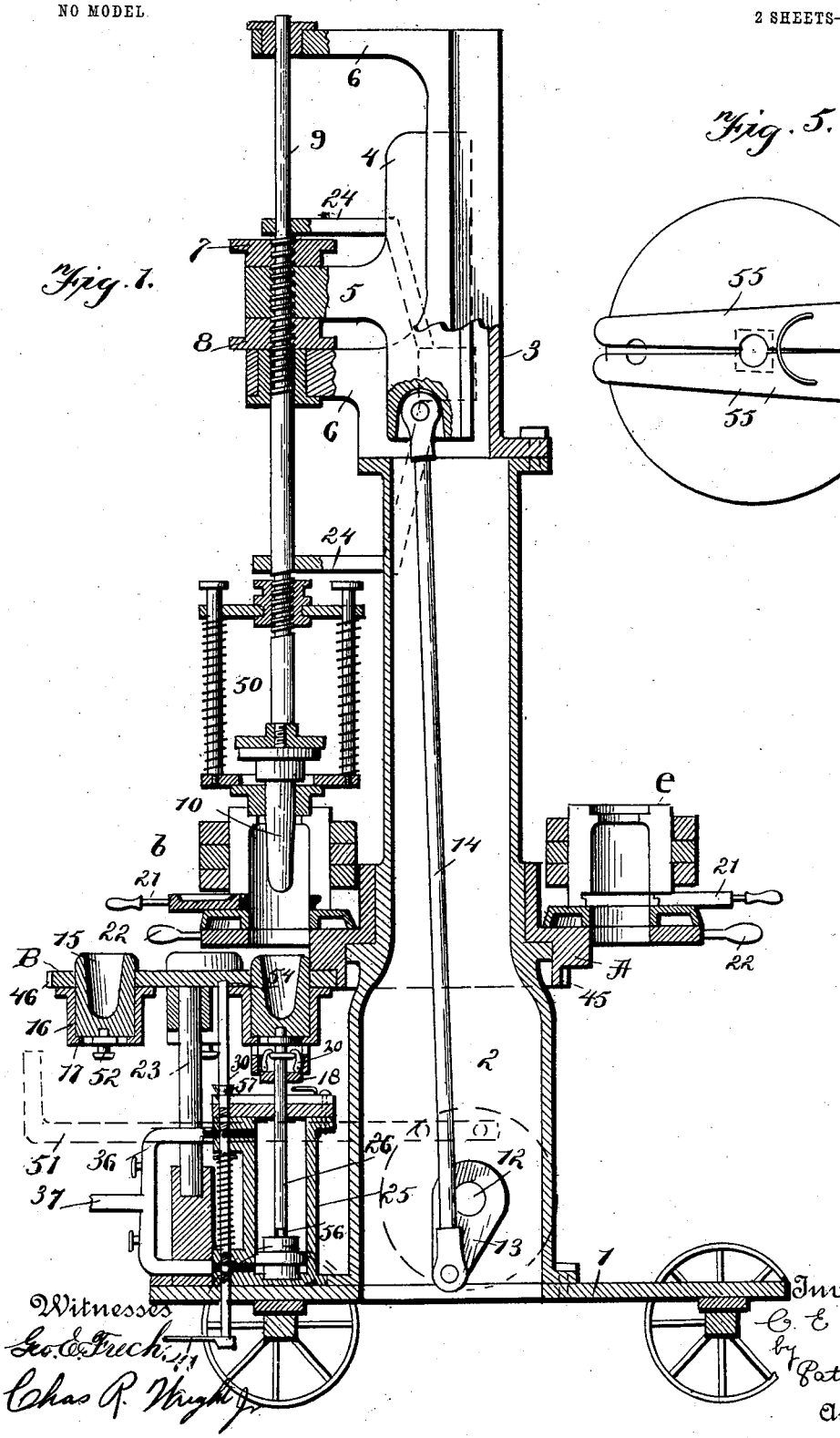

No. 733,805. PATENTED JULY 14, 1903.
C. E. BLUE.
MACHINE FOR THE MANUFACTURE OF GLASSWARE.
APPLICATION FILED NOV. 16, 1896.
NO MODEL. 2 SHEETS—SHEET 2.
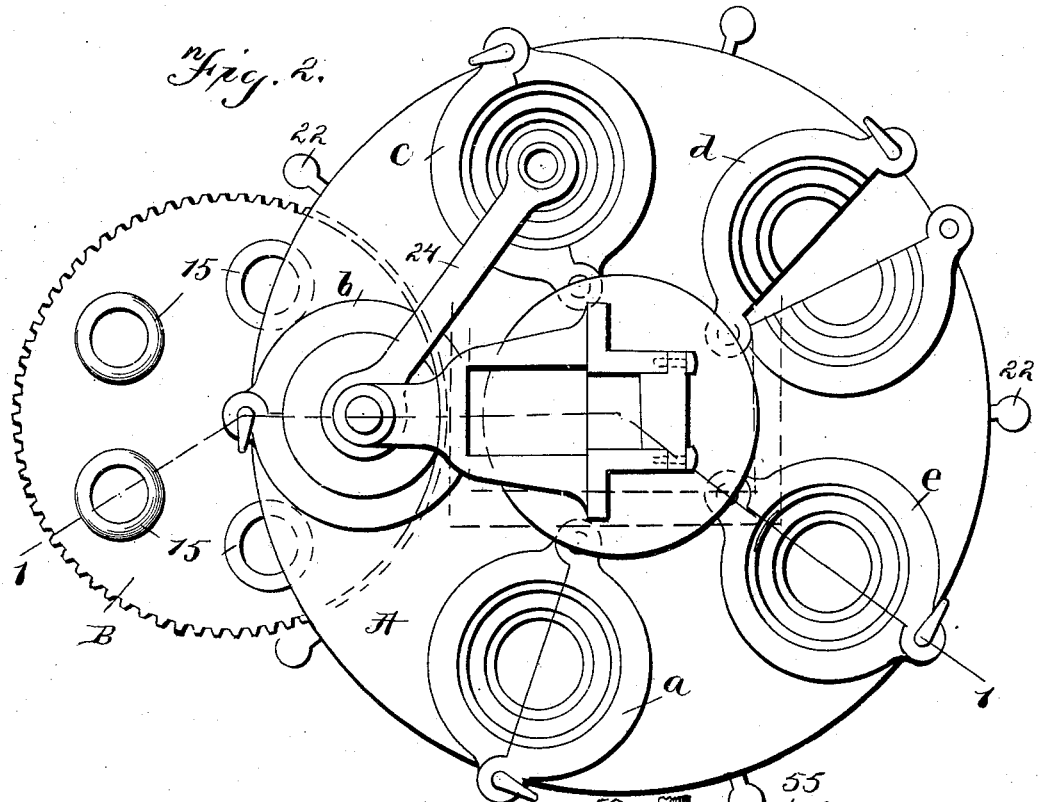
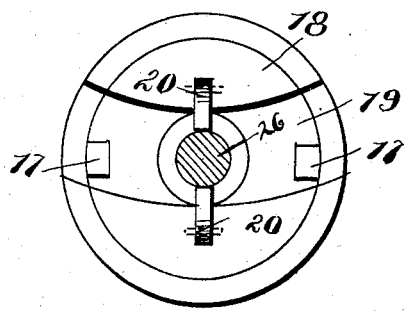
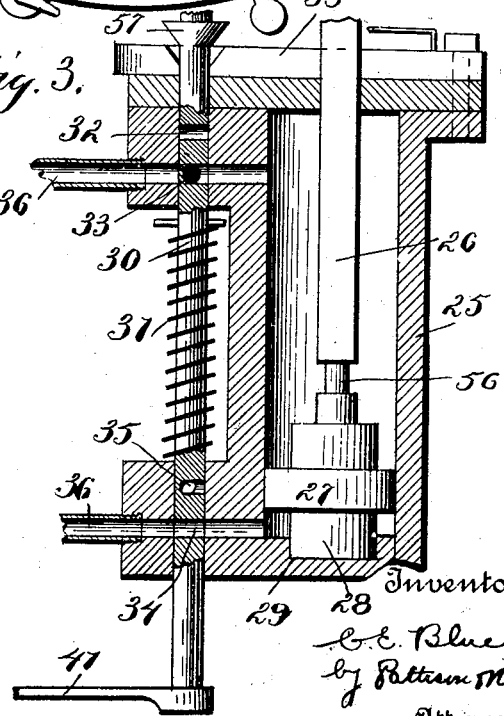
Witnesses
Geo. E. Fuch.
Chas. R. Wright Jr.
Inventor
C. E. Blue
by Pattison Nesbit
Attorneys.

No. 733,805. Patented July 14, 1903.

UNITED STATES PATENT OFFICE.

CHARLES EDWIN BLUE, OF WHEELING, WEST VIRGINIA.

MACHINE FOR THE MANUFACTURE OF GLASSWARE.

SPECIFICATION forming part of Letters Patent No. 733,805, dated July 14, 1903.

Application filed November 16, 1896. Serial No. 612,331. (No model.)

*To all whom it may concern:*

Be it known that I, CHARLES EDWIN BLUE, of Wheeling, in the county of Ohio and State of West Virginia, have invented certain new and useful Improvements in Machines for the Manufacture of Glassware; and I do hereby declare the following to be a full, clear, and exact description of the invention, such as will enable others skilled in the art to which it pertains to make and use it, reference being had to the accompanying drawings, which form part of this specification.

My invention relates to improvements in machines for the manufacture of glassware, and pertains to that character of machines having a plurality of molds in which the charging, pressing, blowing, and discharging of the article being formed are carried on at the same time, whereby a finished article—such as a jar, bottle, glass, or similar vessel—is completed at each movement of the mechanism.

The object of my present invention is to provide two carriers, one carrier supporting a plurality of molds and the other carrier a plurality of bottoms adapted to coöperate with the molds, all of which will be fully described hereinafter.

In the accompanying drawings, Figure 1 is a vertical section of a machine embodying my invention, taken on the dotted line 1 1 of Fig. 2. Fig. 2 is a top plan view of the same. Fig. 3 is an enlarged vertical sectional detail view of the operating-cylinder and its valve. Fig. 4 is a detail view of the head carried by the cylinder piston-rod. Fig. 5 is a detached enlarged plan view of the jaws 55.

Referring now to the drawings, 1 indicates a base, preferably supported upon wheels, as here shown, to be conveniently transported around the factory, and 2 a housing supported upon the said base. At the top of the housing 2 is an extension 3, forming a slideway and a support for a vertically-reciprocating head 4. This head 4 is provided with a laterally-projecting arm 5, through which and to which the presser-head rod 9 is connected, whereby the movement of the head 4 carries with it the presser-head 10 and the presser-rod for effecting the pressing operation. The extension or slideway 3 is provided at its upper and lower ends with the laterally-extending arms 6, through which the presser-head rod 9 passes, the said arms 6 forming a guide and a support for the rod. The rod 9 is adjustably connected with the arm 5 of the sliding head through the medium of the nuts 7 and 8, which clamp the rod on opposite sides of the arm, the rod being provided with screw-threads, as shown in Fig. 1. This arrangement permits of the adjustment of rod 9 through the arm 5 for the purpose of regulating the depth to which the presser-head 10 shall extend within the mold, as will be readily understood. The pressure-rod 9 carries the usual pressure-head mechanism 50 and which is so well understood by those skilled in the art that a description in this connection is unnecessary.

Supported upon and rotatable around the housing 2 is a table A, carrying a plurality of molds $a$, $b$, $c$, $d$, and $e$, as clearly shown in Fig. 2. Supported upon a rod 23 or other suitable support is an auxiliary or bottom-carrying table B, carrying a plurality of bottoms 15, as also clearly represented in Fig. 2. As here shown, the table A is provided with five molds and the table B with a corresponding number of primary or pressing bottoms 15. This number, however, may be varied without departing from the essential feature of my invention, which pertains to providing one carrier for a plurality of molds and another carrier for a plurality of bottoms. Also, if desired, without varying my invention the number of molds carried by the table A may be increased or diminished in respect to the number carried by the table B, and vice versa. The molds upon the table A are provided with secondary or blowing bottoms 21, and, referring to Fig. 2, $a$ represents the charging mold or position; $b$, the pressing-mold; $c$, the blowing-mold, and $d$ the discharging-mold. The mold $e$ may be omitted, if desired, thus providing the table A with only four molds. By providing five molds, however, a greater length of time between the pressing and blowing in the respective molds is provided, and this number is found to best keep the molds and bottoms at about the proper temperature, so that they are neither overheated or permitted to become too cool for good and reliable work, though, as before stated, the number of molds and bottoms carried by the respective tables may be varied at will.

The manner of rotating the table A is here shown as through the medium of laterally-projecting handles 22, and, as here shown, the auxiliary or bottom carrier B is correspondingly rotated through the medium of a gear 45, carried by the table A, engaging the periphery of the table B, which is also cut into the form of a corresponding gear 46, whereby the two tables mesh together and move correspondingly, so that when either table is in the position for the pressing, blowing, charging, or refixing the coöperating table is in a position to operate in connection with the molds and bottoms—that is to say, the auxiliary table and the main or mold table A are in a position with the molds of one table registering with the primary or pressing bottoms 15 of the other table.

While I here show the tables as meshing, so that when one is moved the other is correspondingly moved, it will be readily understood that the tables may be entirely independent of each other and each independently moved to register with the other for their proper operation, though of course it is advantageous to have an operative connection between the tables, so that when one is moved the other is correspondingly and properly moved to register with each other.

The presser-head rod 9 is moved through the medium of a shaft 12, passing through the lower portion of the housing 2, the said shaft carrying a crank-arm 13, to which the lower end of a pitman 14 is connected, the upper end of the said pitman being suitably attached to the head 4, so that when the shaft is operated through the intervention of the operating-lever 51 the pressing-head is moved up or down, according to the direction in which the operating-handle is moved.

Situated at one side of the housing upon the base 1 is a cylinder 25, carrying a piston-head 27, with a piston-rod 26 projecting through the upper end or head of the cylinder, and this projecting end of the piston-rod carries a head 18. This head 18 is provided with catches 20, adapted to engage a headed projection 52 on the bottoms of the primary or pressing bottoms 15, as illustrated in Fig. 1. This head 18 is provided with a curved slot 19, as illustrated in Fig. 4, through which the headed projection 52 of the primary bottoms passes. This formation of the head carried by the piston-rod 26 permits the headed projection of the primary mold to move into the curved groove 19, which groove or slot corresponds in curvature to the circle scribed by the molds as they are moved around by the table B. The headed projections move under and are caught by the catches 20 of the head 18, as represented in Fig. 1, whereby when the piston-head and its rod are moved either up or down the primary bottom engaged thereby is correspondingly moved.

A pipe 36 has its ends connected with opposite ends of the cylinder 25, as clearly shown in both Figs. 1 and 3, and a pipe 37 communicates with the pipe 36 and with any source of pressure, such as air or water, the former being preferred. A valve-rod 30 passes through the communication to the opposite ends of the cylinder and is provided with the transverse openings 33 and 34, which register with the said communications, respectively. As shown in Figs. 1 and 3, the piston-head is at the bottom of the cylinder and the valve, having its upper end extended and adapted to engage recesses 54 in the table B and is in its upward position, being held there through the medium of the surrounding spring 31. When in this position, air is admitted to the lower end of the cylinder, carrying the piston-head, its rod, and with it the registering primary bottom up within the mold above and in position to be charged and after being charged to have the presser-head carried therein and the glass pressed through the medium of the mechanism before described. This operation having been performed, the operator by putting his foot upon the foot-piece 41 of the valve depresses the valve and through the medium of the openings 33 and 34, in connection with the passages 32 and 34 through the valve, reverses the pressure in the cylinder, permitting it to pass in the upper end of the cylinder and to escape at the lower end through the lateral opening 35, all of which will be fully understood by those versed in the art. When the valve is depressed, as just described, the operator throws the presser-head upward, turns the table, and immediately releases the valve, so that the extension is then in engagement with the under side of the table B. As soon as the table is turned sufficiently to have the upper end of the valve extension engage the next cavity the valve automatically moves upward, and automatically the next primary bottom is carried into its corresponding mold above, ready to be charged and pressed. This operation is continued, the charging being done in the mold $a$, the pressing in the mold $b$, the blowing in the mold $c$, and the discharging in the mold $d$, as before stated, so that at each intermittent movement of the tables a completed article is produced.

The blowing-head, which may be either of the construction shown in my patent granted to me on the 25th day of December, 1894, or of any other desired form, is supported through the medium of the arms 24, which surround the presser-rod 9, whereby the blowing-head is moved up and down and seated and unseated from the blowing-mold at the same time and by the same movement which does the pressing and the withdrawing of the pressing-head from the molds, as fully described in my aforesaid patent.

Situated upon the upper head of the cylinder 25 are the spring-jaws 55, adapted to engage a groove 56 in the piston-rod when the piston-head is carried upward and the primary bottom within the mold. These jaws then serve to hold the mold firmly during the pressing operation. The valve extension is provided with a wedge or taper head 57, adapted to pass between these jaws and to separate them when it is depressed. The jaws are therefore first separated before pressure is reversed from the lower to the upper end of the cylinder, so that the piston-head is permitted to move freely downward when the pressure is reversed in the cylinder. The lower end of the piston-head is provided with a projection 29 and the lower head or end of the cylinder with a cavity 28 to receive it, whereby an air-cushion is provided to prevent jar and hammering when the primary bottom is lowered from within the molds. As soon as it is lowered the operator removes the secondary or blowing bottom 21 inward within the mold ready for the blowing operation, and then the table is moved to carry that mold around to the blowing position.

It will thus be seen that I have provided separate carriers for the molds and the bottoms and means for pressing and blowing, as well as means for operating the bottoms carried by the auxiliary table, all of which are simple and durable in construction and at the same time so arranged as to be capable of quick manipulation, enabling the operator to produce large numbers of articles, being constructed with but little labor.

Having thus fully described my invention, what I claim, and desire to secure by Letters Patent, is—

1. In a glass pressing and blowing machine, the combination with a mold-carrier carrying a plurality of molds, a bottom-carrier having a plurality of cavities or recesses in its under side, a plurality of bottoms corresponding to the number of cavities, an upwardly-extending member adapted to enter said cavities and means controlled by the said upwardly-extending member for lowering said bottoms, substantially as described.

2. A glass pressing and blowing machine comprising a mold-carrier carrying a plurality of molds, a bottom-carrier carrying a plurality of bottoms, an actuating member for said bottoms, and a controller for said actuating member movable in one direction independent of said bottom-carrier, and its movement in the other direction controlled by the engagement thereof with the bottom-carrier, substantially as described.

3. In a glass pressing and blowing machine, the combination with a rotatable table carrying a plurality of molds, of a rotatable table carrying a plurality of vertically-movable bottoms and geared to said mold-table, a piston below said table, means controlled by the bottom table for admitting air to said piston and forcing it up under said bottoms, means for holding said piston up, and means for releasing the piston-holding means, substantially as described.

4. In a glass pressing and blowing machine, the combination with a rotatable table carrying a plurality of molds, of a rotatable table carrying a plurality of vertically-movable bottoms and geared to said mold-table, a cylinder below said table, a piston within said cylinder means carried by the piston for raising said mold-bottoms and holding them during the pressing operation, a valve for controlling the inlet-ports to said cylinder, and means carried by the upper end of said valve for locking said mold-table, substantially as described.

5. In a glass blowing and pressing machine, the combination with a rotatable mold-table, a rotatable table carrying a series of vertically-movable mold-bottoms below said table, a cylinder below said table, a piston within the cylinder and adapted to raise said mold-bottoms, means carried by the cylinder for holding said piston during the pressing operation, a valve controlling the inlet to said cylinder, and means carried by the valve for releasing said piston-holding mechanism, substantially as described.

6. In a glass pressing and blowing machine, the combination with a rotatable mold-table, a rotatable table carrying a series of vertically-movable mold-bottoms below said table, a cylinder below said mold-bottoms, a piston within said cylinder, means carried by said piston for raising said bottoms, means carried by the cylinder for holding said piston during the pressing operation, a valve controlling the inlet for said cylinder, means carried by said valve for holding said mold-table during the pressing operation, and means carried by said valve for releasing said piston-holding mechanism, substantially as described.

7. In a glass blowing and pressing mechanism, the combination with a rotatable mold-table, a rotatable mold-bottom table below said table having vertically-movable mold-bottoms, a cylinder below said table, a piston within said cylinder, a piston adapted to engage said mold-bottoms, and notched intermediate its ends, arms pivoted to said cylinder and adapted to engage said notch and hold the piston during the pressing operation, and means for releasing said arms, substantially as described.

8. In a glass pressing and blowing machine, the combination with a rotatable mold-table, a rotatable mold-bottom table having vertically-movable mold-bottoms below said table, a cylinder below said mold-bottom table, a piston within said cylinder, a piston-rod having a notch adjacent said piston, arms pivoted at one end and normally held in engagement with said piston-rod, and adapted to enter said notch, and hold the piston during the pressing operation and means for throwing said arms out of said notches, substantially as described.

9. In a glass blowing and pressing machine, the combination with a rotatable mold-table, a mold-bottom table having vertically-movable mold-bottoms, and below said mold-table, a cylinder below said mold-bottom table, a piston within said cylinder, a piston-rod secured to said piston and having a notch adjacent the piston, and adapted to raise said mold-bottoms, arms having one end pivoted to the cylinder and normally held in engagement with the piston-rod and adapted to enter said notch, a valve for operating the inlet-ports to the cylinder, a valve-stem extending up and passing between said arms and a beveled projection carried by the stem and adapted to separate said arms for the purpose of releasing the piston-rod, substantially as described.

10. In a glass blowing and pressing machine, the combination with a rotatable mold-table, a rotatable mold-bottom table below carrying a series of vertically-movable mold-bottoms, a cylinder below said mold-bottoms, a piston within the cylinder and having a notch adjacent the piston, a piston-rod adapted to raise said mold-bottoms, arms having one end pivoted to the cylinder and normally held in engagement with the piston-rod, and adapted to engage said notch, a valve controlling the inlet-ports to the cylinder, an upwardly-extending stem passing between said arms and having its upper end engaging notches in the bottom of the mold-bottom table, and a beveled projection adapted to separate said arms for the purpose of releasing said piston-rod, substantially as described.

11. In a glass pressing and blowing machine, the combination with a supporting-frame, a rotatable mold-table, mounted thereon, an upwardly-extending casing carried thereby, a slideway therein, laterally-extending arms carried by the casing at the top and bottom of said slideway, a presser-head rod passing through said arms, a presser-head carried by the lower end of said rod, and adapted to enter said mold, a reciprocating head in said slideway, an outwardly-extending arm carried by said head and adapted to receive the presser-head rod, nuts on both sides of said arm, and means for reciprocating said head, substantially as described.

12. In a glass pressing and blowing machine, the combination with a rotatable table carrying a plurality of molds, of a rotatable table carrying a plurality of vertically-movable bottoms, a piston below said table, means for admitting air to force said piston upward under said bottom, means for holding said piston up while the glass is being pressed, and means for releasing said means, substantially as described.

13. A glass pressing and blowing machine comprising a rotating mold-carrier, a plurality of molds carried thereby, a rotatable bottom-carrier carried below the mold-carrier and operated thereby, a plurality of vertically-movable bottoms carried by the bottom-carrier, means for raising and lowering said bottoms and means for holding said means in a raised position with the bottoms within the molds, substantially as described.

14. A glass pressing and blowing machine comprising a rotating mold-carrier, a plurality of molds carried thereby, a rotatable bottom-carrier operated by the mold-carrier, vertically-movable mold-bottoms carried thereby, a cylinder, a piston within said cylinder, a piston-rod carried by said piston and adapted to engage said mold-bottoms, means for automatically locking the upper end of the piston-rod to the vertically-movable mold-bottoms, means for automatically holding the piston-rod in the upper position, the piston-rod being uncoupled from said mold-bottom by the rotation of the bottom-carrier, and means for automatically releasing the piston-rod-holding means, substantially as described.

15. A glass pressing and blowing machine comprising a rotating mold-carrier, a rotating bottom-carrier operated thereby, vertically-movable mold-bottoms carried thereby, a vertically-movable piston-rod below said bottoms, and means for admitting air to force said piston upwardly during the pressing operation, means for holding said piston in an upward position, and means for automatically releasing said piston-holding means, substantially as described.

16. A glass pressing and blowing machine comprising a rotating mold-carrier, a rotating bottom carrier operated thereby, vertically-movable mold-bottoms carried thereby, a vertically-movable piston-rod, means for automatically coupling said piston to the mold-bottoms, and means for holding said piston-rod up during the pressing operation, substantially as described.

17. A glass pressing and blowing machine comprising a rotating mold-carrier, a rotating bottom-carrier operated thereby, vertically-movable mold-bottoms carried thereby, a means for moving said mold-bottoms upward, means for locking said means in said upward position, and means for automatically releasing said locking means, substantially as described.

In testimony whereof I affix my signature in presence of two witnesses.

CHARLES EDWIN BLUE.

Witnesses:
A. G. HUBBARD,
L. V. BLUE.